United States Patent [19]

Downing et al.

[11] 4,248,105
[45] Feb. 3, 1981

[54] HORIZONTAL STABILIZER DRIVE

[75] Inventors: James W. Downing, Buena Park; Teunes Verhoeven, Long Beach, both of Calif.

[73] Assignee: McDonnell Douglas Corp., Long Beach, Calif.

[21] Appl. No.: 946,145

[22] Filed: Sep. 27, 1978

[51] Int. Cl.³ .................... F16H 1/44; F16D 9/00; G05G 7/00
[52] U.S. Cl. .................. 74/710.5; 64/28 R; 74/469; 74/713; 244/213
[58] Field of Search .............. 74/710, 710.5, 711, 74/713, 469, 471 R, 479; 244/75 R, 84, 213; 64/28 R

[56] References Cited

U.S. PATENT DOCUMENTS

| | | | |
|---|---|---|---|
| 272,233 | 2/1883 | Gates | 64/28 R |
| 1,156,397 | 10/1915 | Dierdorff | 64/28 R |
| 1,324,857 | 12/1919 | Taylor | 74/710.5 |
| 1,324,859 | 12/1919 | Taylor | 74/710.5 |
| 1,832,254 | 11/1931 | Spanovic | 74/471 R |
| 1,869,326 | 7/1932 | Ludlow | 74/471 R |
| 2,298,316 | 10/1942 | Simmons | 64/28 R |
| 2,439,393 | 4/1948 | Kerr | 74/471 R |
| 2,495,016 | 1/1950 | Mesick | 74/710.5 |
| 2,775,142 | 12/1956 | Brensike et al. | 74/711 |
| 2,778,245 | 1/1957 | Thornton | 64/28 R |
| 3,053,114 | 9/1962 | Singer | 74/710.5 |
| 3,282,130 | 11/1966 | Nishimura | 74/710.5 |
| 3,342,084 | 9/1967 | Randall | 74/711 |
| 3,390,586 | 7/1968 | Colville | 74/469 |
| 3,790,108 | 2/1974 | Bock | 74/469 X |
| 3,886,813 | 6/1975 | Baremor | 74/710.5 |
| 3,906,812 | 9/1975 | Kagata | 74/711 |
| 3,915,032 | 10/1975 | Ottemann | 74/711 |
| 4,043,224 | 8/1977 | Quick | 74/710.5 |

Primary Examiner—Allan D. Herrmann
Attorney, Agent, or Firm—Paul T. Loef; Walter J. Jason; Donald L. Royer

[57] ABSTRACT

A mechanical power transmission apparatus, of the differential gear type, for actuating an airplane control surface requiring two independent actuator inputs to a single control surface. Asymmetric loading to the control surface is accommodated by a mechanical fuse link. The fuse link is provided by employing a shear pin to attach the pinion gear to the pinion shaft, designed to fail at a predetermined differential torque between the two driven bevel gears. Positive disengagement of the gears is provided following fuse link release.

14 Claims, 8 Drawing Figures

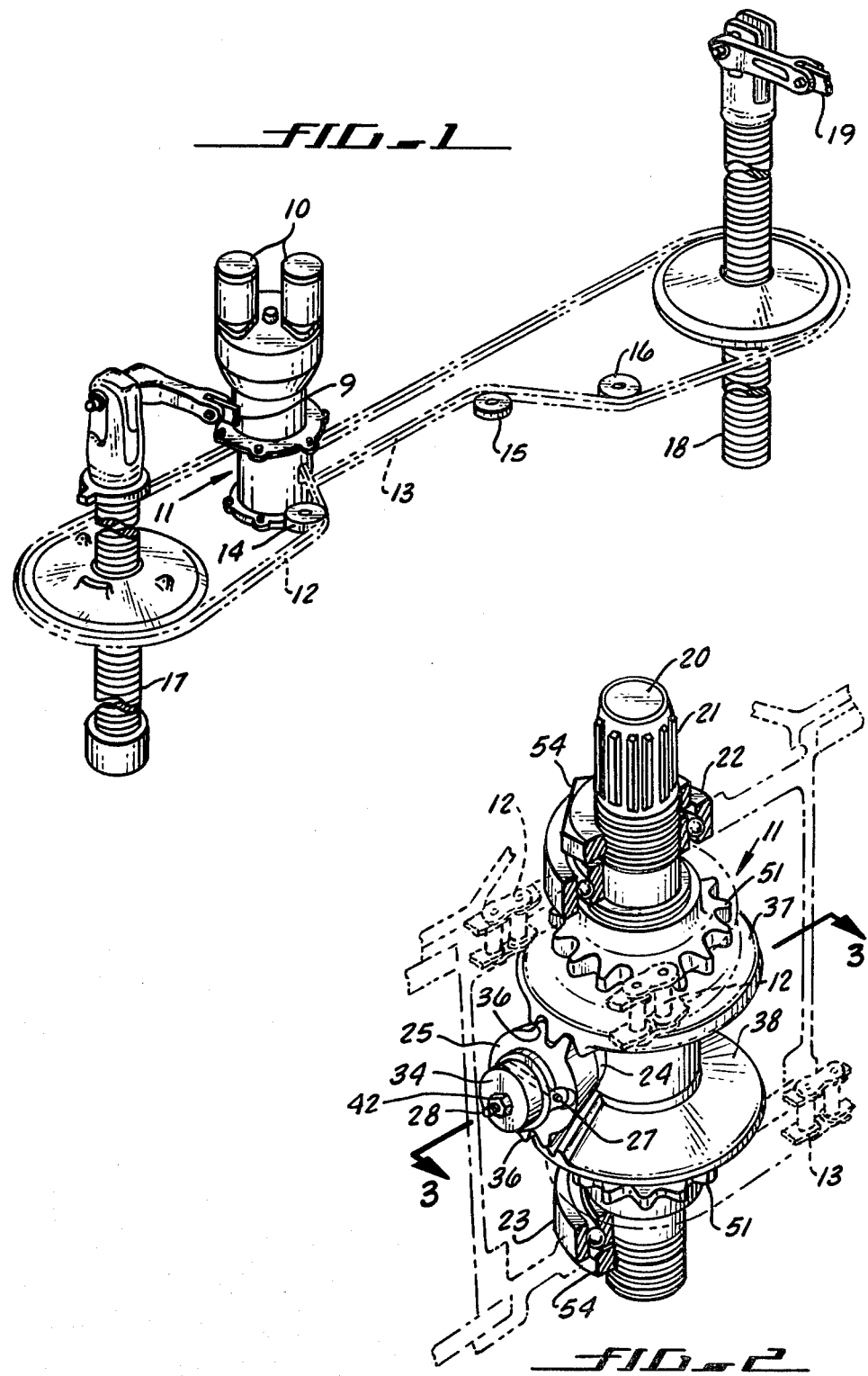

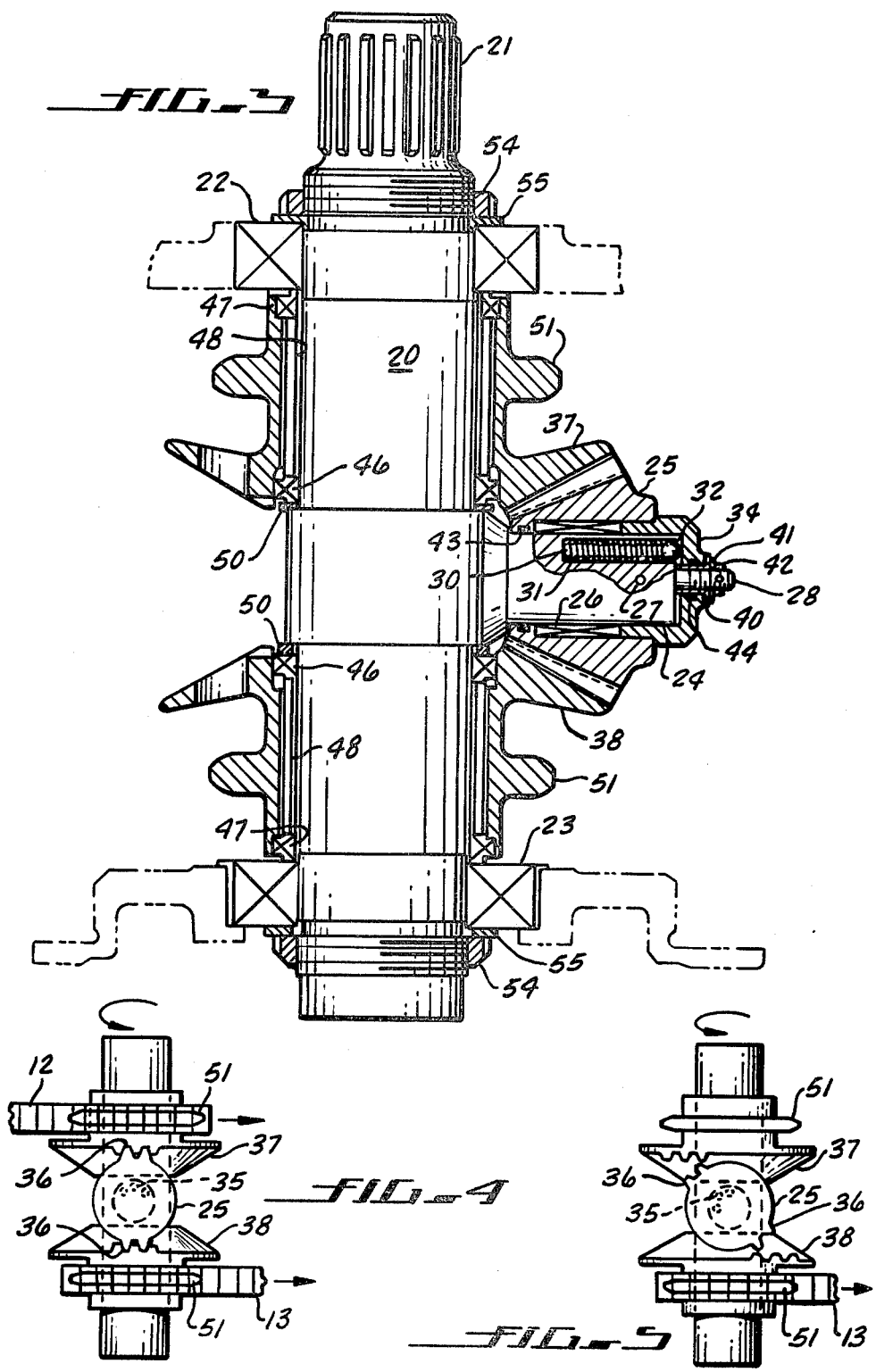

HORIZONTAL STABILIZER DRIVE

BACKGROUND OF THE INVENTION

This invention pertains to differential type torque limiting devices for mechanical power transmission, and more particularly, to such devices having a single input with two outputs driving two independent actuators which in turn drive a single control surface or device which will tolerate only limited asymmetric loads.

Typically, a single moveable auxiliary airfoil, e.g. a horizontal stabilizer may be actuated by a single actuator although it may employ a torque tube and multiple linkages. However, a single actuator restricts provisions for suitable redundancy in the system in the event of failure of the actuator, its structural support, or its connection to the control surface. Particularly acute is a horizontal stabilizer trim system wherein the entire stabilizer is rotated to provide trim. In the event of an actuator load path failure, the entire stabilizer would be free to rotate about its hinge line and the elevators could not compensate. Dual actuators, either of which will support the stabilizer, but not necessarily drive it alone, provide adequate redundancy. Acme jackscrews provide these requirements. However, employment of dual actuators necessitates not only synchronization of the actuators but the airfoil section rotated must be structurally capable of withstanding a failed or jammed single actuator while the remaining actuator applies the force associated with the stall torque of the drive means. Alternately, provisions must be made to avoid this load condition.

This inventive device was employed to modify an actual system in commercial use which employed a redundant chain drive to each actuator to avoid the failed chain load condition. Additionally, a chain failure monitoring system was incorporated as a single failed chain could not be detected short of visual inspection. Obviously, without the detection system, a single chain could fail to either or both actuators, the system would function as usual, but the benefit of the redundancy would be lost. The benefit of the redundancy was also lost if the detection system experienced a failure.

The innovative device of this invention was employed in the system which eliminated the redundant chains and sprockets as well as the associated idlers, chain protectors required to prevent a failed chain from jamming an operative chain and the failure monitor. The net result was a fused torque detection drive system which prevents structural overloads of the control surface in case of a failed chain or a jammed actuator as well as realizing an 80 pound weight reduction and enhanced system reliability. Of course, in either case, the surface being controlled must be of a nature that its loss will not totally debilitate the vehicle as in the case of a trim tab where the prime surface is independently actuated.

BRIEF SUMMARY OF THE INVENTION

The present invention is a differential torque limiting device for mechanical power transmission having a single input and dual outputs, particularly adaptable to aircraft control surface actuation. While the invention pertains to any epicyclic gear train of the differential motion type, it will be described with a specific gear type and arrangement for the sake of clarity. The input torque is applied to a drive shaft which supports a pair of facing bevel gears free to rotate with respect to the drive shaft. The drive shaft supports a pinion gear on a pinion axle which is attached to, and oriented 90° to the drive shaft axis. The pinion gear is positioned between, engaging, and driving the two bevel gears in a conventional differential gear arrangement. The pinion gear is restrained from rotating on its shaft by a shear pin designed to fail at a predetermined shear value which governs the allowable differential torque the two drive bevel gears can experience. Hence, rotation of the drive shaft rotates the attached pinion shaft and since the pinion gear is restrained from rotating by the shear pin, it in turn drives the two bevel gears without relative motion between the gears. Should a differential load be experienced between the two bevel gears of sufficient magnitude to fail the shear pin, the pinion will then rotate on its own shaft and will do so with respect to either bevel gear experiencing the higher resisting load. Of course, if one bevel gear has lost its load, that gear may continue to rotate along with the pinion gear in relation to the loaded or jammed bevel gear. The pinion gear, in essence, works as a balance beam, and as long as the loads on the two bevel gears remain the same, the three gears will rotate as a unit, without relative rotation. This result prevails even if the shear pin is removed. However, in practice, loads are not identical. Differential loading is accommodated by the torque required to fail the shear pin.

Means are provided to insure disengagement of the gears following shear pin failure. In the preferred embodiment, all the teeth are removed from the gears except those in engagement in the static condition. This embodiment ensures passing clearance between the pinion and sprockets after ititial movement following shear pin failure.

An object of the invention is to accomodate a predetermined differential torque due to operating tolerances where a single prime mover operates dual, synchronized actuators, but also prevents structural damage to the driven surface in the event of a jammed actuator or total loss of the driving means to one actuator. Further objects of the invention are weight reduction and enhanced reliability by elimination of items subject to failure.

BRIEF DESCRIPTION OF THE DRAWINGS

FIG. 1 is a perspective view of an airplane control surface actuation system, including a drive motor, drive fuse, two chains shown in reference, each of which drives a jackscrew which in turn drives the control surface, not shown;

FIG. 2 is a perspective view of the drive fuse with the support structure generally shown in phantom lines and partially removed, (including the support bearings) for clarity;

FIG. 3 is a section view of the fuse drive shown in perspective in FIG. 2, taken on section lines 3—3, with the upper structure support removed;

FIG. 4 is a functional drawing showing the drive fuse in normal load operation;

FIG. 5 is another functional drawing showing the fuse drive with a failed drive chain or jammed jackscrew;

DETAILED DESCRIPTION OF THE PREFERRED EMBODIMENT

Figure 6:
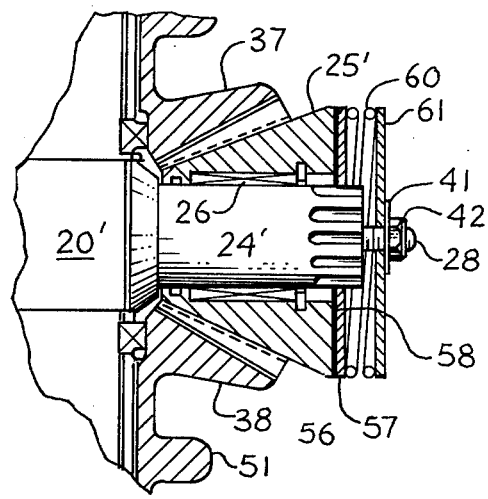
FIG. 6 is a partial view of the fuse drive showing an alternative embodiment of the pinion gear and its attachment to the pinion axle.

A representative commercial airplane horizontal stabilizer trim drive actuation system is shown in FIG. 1 without the control surface. The prime movers are shown as hydraulic motors, 10 each of which can drive the fuse drive 11, which, in turn, drives the two chain drives 12 and 13 about the idlers 14, 15, and 16 to the left jackscrew 17 and the right jackscrew 18. The two jackscrews 17 and 18 are attached to a hinged control surface (not shown) at 9 and 19. The two jackscrews must drive the control surface synchronously to avoid structural damage to the control surface and must accomodate a single failed drive chain or a stalled actuator. At the same time, the system must be capable of accommodating differential loads between the two jackscrews, e.g. variations in actuator efficiencies which can be substantial when employing acme thread jackscrews as shown.

Turning to the detail, FIGS. 2 and 3 show the details of the fuse drive 11. The drive shaft 20, which is driven by the hydraulic motor 10, via the splines 21, is supported by the bearings 22 and 23. Supporting structure for the bearings is shown in phantom lines. Integrally attached to the drive shaft 20 is the pinion shaft 24. Pinion gear 25 is radially supported by roller bearing 26 (FIG. 3) on the axle portion of the pinion shaft 24.

In the preferred embodiment shown, a special effort has been made to retain the pinion gear following rotation which will be explained in detail later. In any case, the pinion gear 25 is retained from rotating with respect to the pinion axle 24 by a suitable means which will take a predetermined amount of torque before the pinion gear is allowed to rotate. In the embodiment illustrated, this is accomplished by the shear pin 27. However, one alternative embodiment is shown in FIG. 6 as a spring-loaded clutch. In this embodiment, the pinion axle 24' is modified to provide a spline at 56, which slideably engages the pressure plate 57. The pressure plate 57 contacts and bears against the end surface 58 of the modified pinion gear 25'. Pressure between the pinion gear 25' and the pressure plate 57 is supplied by the spring 60, which is compressed by the end plate 61 and the force adjusted by the nut 42 on the threaded stud 28. In this configuration the roller bearing 26 is retained by the added snap ring 62 contained in an appropriate groove in the modified pinion gear 25'. Obviously, a great variety of different types of clutches may be used to retain the pinion gear to its axle.

The end of the pinion shaft 24 is provided with a stud 28 on axial centerline and a bore 30 off centerline. Bore 30 accommodates a coil spring 31 and a ball 32 to combine to form a detent. End cap 34 is pressed into the inside diameter of the pinion gear 25 to retain the roller bearing 26, but clear the pinion shaft 24. The inside end surface of the end cap 34 is provided with 3 conical depressions located on a radial centerline to match the ball 32 retained in the bore 30 in the end face of the pinion shaft 24. The center depression 35 shown in FIGS. 4 and 5 (invisible lines) is indexed to split the pair of bevel gear teeth 36 on the pinion gear 25. Each pair of pinion gear teeth 36 centrally engage the matching set of three gear teeth on each bevel gear 37 and 38. Bevel gear 25 rotates in conjunction with the end cap 34 receiving thrust support from the bushing 40 which is held in place on the stud 28 by the nut and washer 41 and 42. Grease lubrication for all the inner mechanics of the pinion gear mechanism is contained by the two o-rings 43 and 44.

Each of the bevel gears, 37 and 38, has an integral chain drive sprocket 51 and is supported by a pair of bearings 46 and 47, separated by a spacer 48. Adjustable shims 50 are provided to accomodate alignment of the two bevel gears with the pinion gear 25.

The first chain 12 driving the left jackscrew and the second chain 13 driving the right jackscrew are both shown in phantom lines on FIG. 2.

The main support bearings 22 and 23 are retained on the drive shaft 20 by the nut and washer 54 and 55 on either end of the drive shaft. These bearings are supported in the aircraft structure shown in phantom.

It should now be reasonably apparent that as the drive shaft 20 is rotated, the pinion shaft 24 scribes a circular path. Since the pinion gear 25 is pinned to the pinion shaft 24 by the shear pin 27 the two bevel gears 37 and 38 must rotate in unison with the pinion gear 25 without relative motion between the gears. As can be seen in FIG. 4, the pinion gear 25 is working as a balance beam between the two bevel gears 37 and 38. It should now also be apparent that as the differential load between the two sprockets 51 increases, the torque tending to rotate the pinion gear 25 increases. If the differential load becomes large enough, as shown in FIG. 5, the shear pin 27 will fail and the pinion gear will be allowed to rotate out of the central detent position 35 to the next detent position depending on the direction of rotation. The detent is provided to lock the pinion gear 25 in a position clear of the bevel gears 37 and 38 to avoid inadvertent contact.

Figure 7:
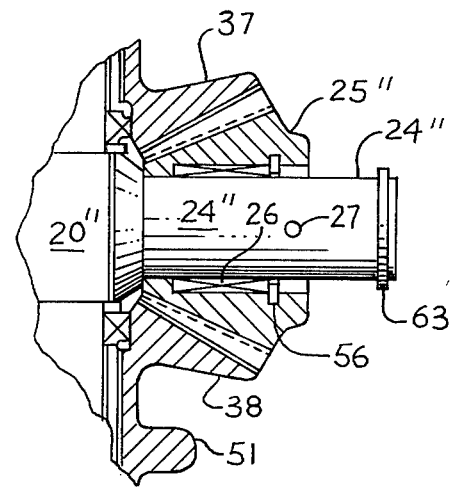
FIG. 7 is a partial view of the fuse drive showing an alternative embodiment of the pinion gear which is permitted to slide out of engagement on the pinion gear axle after the shear pin fails.

However, an alternative embodiment is to allow the pinion gear 25 to slide on the pinion shaft 24 following the failure of the shear pin 27. The angle of the bevel gears provides the thrust to force the pinion gear out of engagement with the bevel gears 37 and 38 and varies in direct proportion to the torque transmitted. In this alternative, the bevel gears may be fabricated with all teeth in place as shown in FIG. 7. The pinion axle 24" is modified slightly by extending the length and adding the retaining ring 63 simply to contain the pinion gear 25" after the pin 27 shears and the gear backs off.

It is imperative, however, that some means be provided to totally disengage the bevel gears following failure of the shear pin 27 in order to insure restricted actuator loads. A single jammed actuator, without this provision, will not restrict the alternate driven bevel gear which is driven at twice normal speed. In the instant application, the second actuator will jam or stall experiencing stall torque of the drive motor at the gear box.

Figure 8:
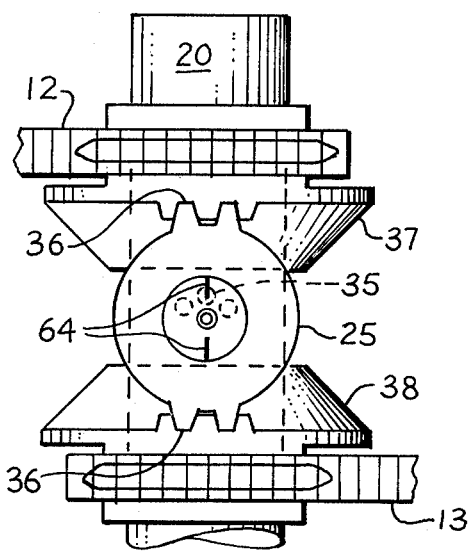
FIG. 8 is a functional drawing showing an index line on the end of the pinion gear as a visible indicator of the shear pin failure and rotation of the pinion gear.

If there is good visible access to the drive, rotation of the pinion gear 25 is readily observable, particularly in the embodiment wherein two pinion gear teeth engage each driven gear. However, if visible access is limited an index line as at 64, FIG. 8, may be oriented with the center depression 35 and any rotation of the pinion gear 25 may be detected by an off-axis position of the index line 64.

While the preferred embodiment shown and described above is a bevel gear type, any epicyclic gear train of the differential motion type is a suitable alternative embodiment. An epicyclic train of gears may be considered to be a train in which part of the gear axes are moving relative to some one of the axes which is the reference or fixed axis. In the described embodiment, the shaft 20 and the pinion shaft 24 correspond with the arm of the epicyclic spur-gear trains. Further a differential motion may be considered to be a motion which is the resultant of, or difference between two original motions.

This invention is not limited to the embodiments disclosed above, but all changes and modifications thereof not constituting deviations from the spirit and scope of this invention are intended to be included.

We claim:

1. In an airplane, an apparatus for the transmission of mechanical power to a first and second driven means which, in turn, drive a single control surface which comprises:
   an epicylic gear train of the differential motion type, said gear train comprising two driven gears and a pinion gear with said pinion gear mounted for rotation on an axle which is attached to an arm which is turning about the axis of at least one of said driven gears;
   means for retaining said pinion gear to said pinion axle so that said pinion gear will rotate on said pinion axle only after a predetermined torque is applied to said pinion gear;
   means for disengaging said pinion gear from said driven gears after release of said means for retaining said pinion gear to said pinion axle; and
   means for attaching said first and second driven means to one each of said driven gears;
   whereby an input torque applied to said epicyclic gear train causes said arm with said pinion gear to rotate, driving both driven gears without relative movement between the three gears until a predetermined differential torque is experienced between said two driven gears which allows the pinion gear to rotate on its axle and disengage said driven gears.

2. A power transmission apparatus as recited in claim 1, in which said means for retaining said pinion gear to said pinion axle is a shear pin which shears at a predetermined torque.

3. A power transmission apparatus as recited in claim 1 in which said means for retaining said pinion gear to said pinion axle is a detent which releases at a predetermined torque.

4. A power transmission apparatus as recited in claim 1, in which said means for retaining said pinion gear to said pinion axle is a clutch which slips at a predetermined torque.

5. A power transmission apparatus as recited in claim 2, wherein said epicyclic gear train of the differential motion type is of the bevel gear type and said means for disengaging said pinion gear from said driven gears after failure of said shear pin further comprises mounting said bevel pinion gear to said pinion axle to permit the thrust force acting between said bevel gears to slide said bevel pinion gear on said pinion axle out of engagement with said driven bevel gears.

6. A power transmission apparatus as recited in claim 2, wherein said disengaging means comprises a pinion gear provided with teeth in two predetermined segments only, diametrically opposite each other to engage said two driven gears.

7. A power transmission apparatus as recited in claim 6, wherein said disengaging means is further enhanced by providing said two driven gears with teeth in predetermined segments only to match and engage said pinion gear teeth.

8. A power transmission apparatus as recited in claim 7 wherein said means for attaching said first and second driven means to one each of said two driven gears further comprises:
   first and second sprockets attached to one each of said two driven gears, and
   first and second chains connecting said first and second sprockets with said first and second driven means respectively.

9. A power transmission apparatus as recited in claim 7, further comprising a means for detecting and indicating a failure of said shear pin.

10. A power transmission apparatus as recited in claim 7, further comprising a means for locking said pinion gear out of engagement with said bevel gears after failure of said shear pin and rotation of said pinion gear.

11. In an airplane, an apparatus for the transmission of mechanical power to a first and second driven means which, in turn, drive a single control surface which comprises:
    a drive shaft, supported in bearings for rotation, and having at least one pinion axle oriented 90° to the axis of rotation of said drive shaft;
    a pinion gear mounted on each of said pinion axles, said pinion gear provided with teeth in two predetermined segments only, diametrically opposite each other;
    a first bevel gear mounted on said drive shaft free to rotate and engaging said pinion gears, said first bevel gear provided with teeth in segments only to correspond with said pinion gear teeth segments;
    a second bevel gear mounted on said drive shaft, free to rotate, opposite said first bevel gear with said pinion gears therebetween and engaging said second bevel gear, said second bevel gear provided with teeth in segments only to correspond with said pinion gear teeth segments;
    a shear pin retaining said pinion gears to said pinion axles so that said pinion gears will rotate on said pinion axles only after a predetermined torque is applied to said pinion gears; and
    means for attaching said first and second driven means to said first and second bevel gears respectively;
    whereby a torque applied to the drive shaft causes the attached pinion axles and pinion gears to rotate, driving both bevel gears without relative movement between the gears until a predetermined differential torque is experienced between the two bevel gears which shears the shear pins retaining the pinion gears which rotate on their axles disengaging the bevel gears.

12. A power transmission apparatus as recited in claim 11 further comprising a means for locking said pinion gear out of engagement with said bevel gears after failure of said shear pin and rotation of said pinion gear.

13. A power transmission apparatus as recited in claim 12 wherein said means for locking said pinion gear out of engagement with said bevel gears after failure of said shear pin and rotation of said pinion gear comprises:

a detent contained in the distal end of said pinion axle; and an end cap fixed and rotating with said pinion gear, said end cap provided with three receptacles to receive said detent, a central receptacle position for normal drive with an alternate receptacle position either side of central to engage said detent following rotation of said end cap fixed to said pinion gear whereby locking said pinion gear out of engagement with said bevel gears.

14. A power transmissin apparatus as recited in claim 13 wherein said means for attaching said first and second driven means to one each of said first and second bevel gears further comprises:

first and second sprockets attached to said first and second bevel gears, and first and second chains connecting said first and second sprockets with said first and second driven means, respectively.

* * * * *